Patented Jan. 2, 1934

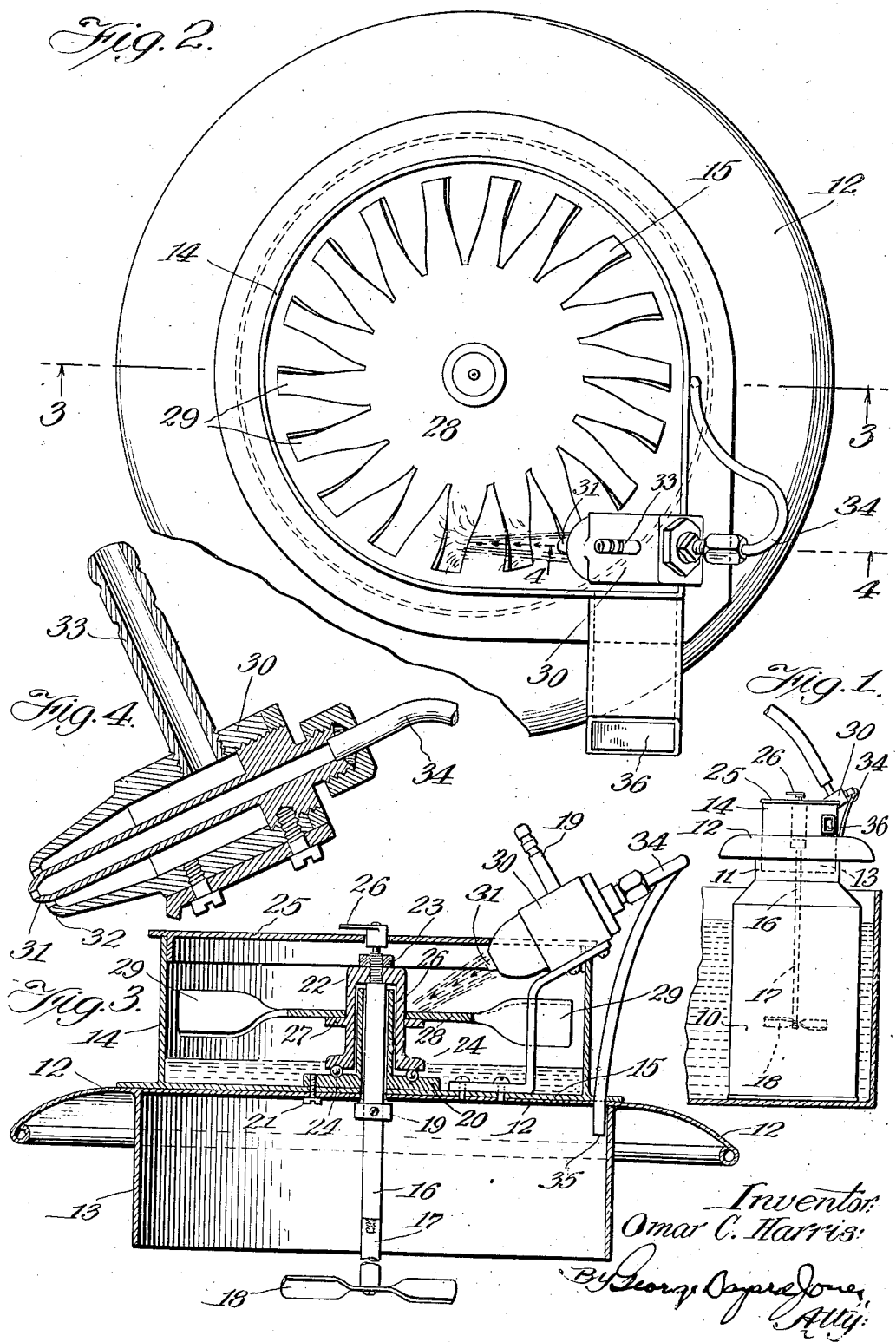

1,942,058

UNITED STATES PATENT OFFICE 1,942,058

MILK COOLER AND DEODORIZER

Omar C. Harris, Chicago, Ill., assignor of one-half to Edward E. Levy, Chicago, Ill.

Application July 17, 1931. Serial No. 551,469

9 Claims. (Cl. 31—4)

My invention relates to improvements in milk coolers and deodorizers.

It has been the practice heretofore to cool cans of fresh warm milk by standing them in cool water and stirring the milk by hand with a stirring rod to permit the water to remove the heat more rapidly. In some cases it has been proposed to rotate the stirring device or agitator by a water wheel on top of the can and permit the water discharged from the wheel to run down over the can to aid in cooling it. It has also been proposed to aerate the milk by having a screw propeller on the agitator shaft and provide small holes near the top of the can so that the milk would circulate rapidly and the warm air in the can would be in open communication with the air outside. However, the air in the upper part of the can of fresh milk is contaminated by animal odors and in stirring the milk to expedite the cooling of it, further animal odors are released and these objectionable odors are not eliminated by any devices or methods now in use, but on the contrary are intensified by stirring the milk when it is confined in a tightly closed can and when a certain amount of ventilation is provided by small screened holes in the top of said can, such ventilation is insufficient to remove said odors. Furthermore, such openings expose the warm milk to the outside air which would result in some cases in the milk becoming contaminated with impure air and odors.

It is an object of my invention to provide simple and inexpensive means for eliminating these objectionable animal odors.

A contributory object is to accomplish this result by creating a partial vacuum in the air space above the milk and drawing off the air through a suitable opening while at the same time permitting clean cool filtered air to replace the foul air withdrawn. This operation may be called a scavenging action.

Another object is to accomplish the above result while stirring and cooling the milk whereby the scavenging action is quick and complete.

A further object is to rotate the stirring device by a water wheel, using the same jet of water which strikes the wheel and rotates it to create the partial vacuum for scavenging the air in the milk can.

An additional object is to wash and cool the incoming air by passing it through water, preferably the water which collects beneath said wheel.

A further object is to provide a self-contained mechanism for accomplishing the foregoing results which may be readily mounted on the conventional umbrella milk can cover without materially changing the latter other than to drill a few holes therein.

Other objects and advantages will be apparent from a consideration of the following description of one embodiment of the invention as illustrated in the accompanying drawing, in which Fig. 1 is an elevation of a milk can with the equipment applied to the cover in the form of an attachment;

Fig. 2 is a top plan view thereof on a larger scale;

Fig. 3 is an elevation partly in section on the line 3—3 of Fig. 2; and

Fig. 4 is an enlarged central section on 4—4 of Fig. 2, of the water and air nozzles.

In Fig. 1 is shown a milk can 10 of the usual configuration having a reduced upper extension or neck 11 and a cover 12 with a depending flange 13 which fits snugly within said neck. The attachment which is shown on a larger scale in Figs. 2 and 3 comprises a housing formed of an upstanding cylindrical flange 14 with a base plate or closure 15, the latter being secured to the can cover 12 by small bolts or other suitable means such as solder. The flange 14 may be soldered directly to the can cover 12 without the intervening plate 15 although the latter is more convenient where the equipment is made in the form of an attachment adapted to be applied readily to existing can covers merely by drilling a few holes therein and bolting the parts together.

A vertical shaft 16 is arranged centrally within the can cover passing through an opening therein, and may be formed in two parts, the lower part 17 constituting an extension secured to the uper part and having an agitator 18 at its lower end, preferably in the form of inclined blades forming a propeller. A collar 19 is applied to the shaft 16, said shaft passing upwardly through a bushing 20 secured to the plate 15 or to the cover 12, or to both, by screws 21 or other fastening devices.

The upper end of the shaft 16 has a shoulder thereon against which is clamped an inverted cup shaped member 22 by means of a nut 23. A ball bearing raceway is formed in the lower end of the member 22 and the upper surface of the member 20 with a series of balls 24 between the two whereby the weight of the shaft and its associated parts is carried by said balls which permit the parts to rotate freely.

The flange 14 constitutes a housing or container which has a cover 25 thereon with a central opening through which the upper end of the shaft 16 projects and on which is screwed a pointer or indicator 26 to indicate when the shaft is rotating.

The cup shaped member 22 has a flange 27 thereon against which rests a water wheel in the form of a disc 28, having blades 29 formed thereon preferably by slitting the metal and turning the vanes at an angle. These vanes are located in line with a jet of water issuing from a structure 30 comprising concentric nozzles 31 and 32, the larger one being a water nozzle and the smaller one being an air nozzle.

The water nozzle, as shown in Fig. 4, has a pipe 33 projecting therefrom at right angles, over which a hose may be fitted and connected to a source of liquid, preferably water cool enough to be used to fill the tank in which the cans stand while the milk is being stirred and deodorized. The jet of water rotates the wheel and thus rotates the vertical shaft and the stirring device near the bottom thereof, causing a circulation of the milk whereby the cooling water surrounding the can removes the excess heat in a very few minutes.

The air nozzle 31 is connected to a tube 34, preferably made of flexible metal such as copper, which tube passes downwardly through an opening in the can cover, terminating at 35 in an exhaust opening within the can cover. The jet of water draws air from the nozzle 31, thus creating a partial vacuum in the air space above the milk in the can, resulting in the withdrawal of said air and such gases and odors as are contained therein, through said exhaust opening 35.

The water discharged from the water wheel flows through an outlet pipe 36 which may extend beyond the flange of the can cover far enough for the falling water to clear the same, although said water may be discharged over the can cover if desired. The size of the discharge opening is such that when the wheel is operating there is always an accumulation of water in the housing 14, the depth of the water being preferably sufficient to more than cover the ball bearings. The cover flange makes preferably an air tight fit with the neck of the can, and therefore I provide a clearance between the cylindrical portion of the bushing 26 and the inverted cup shaped member 22, whereby air may be drawn down through the water to clean and cool it, whence it passes through the clearance space provided by said ball bearings, then up between the concentric parts 22 and 26 and down around the upper part of the shaft 16 and through the opening in the cover into the space above the milk in the can, and thus introduce clean, cool air into said space and permit the contaminated air to be withdrawn through the air nozzle.

To further insure that the incoming air is both clean and cool, the water level in the housing 14 is such that said air is compelled to pass through the water before reaching the clearance space between the cylindrical members 22 and 26 just referred to and as the latter extends well above the water level there is no danger of drawing the water down into the milk can with the slight suction available.

It will be seen that the device is very economical in that cooling water is usually required in any case in which to partly immerse the milk cans, and the stream of cooling water is used not only to cause the milk to be stirred but to create the necessary partial vacuum as well.

Although the apparatus is described particularly in connection with the cooling and deodorizing of milk for which it is particularly effective, it will be understood that it is not limited to such use but may be used with various other liquids.

While the means for mechanically stirring the milk and the means for creating the partial vacuum are combined in practically a single structure, it is obvious that they may be independent of each other and one may be used without the other, although simultaneous carrying out of both functions is preferable. Furthermore, although it is preferred to use standard can covers for the mounting of the attachment, it is evident that a special attaching structure may be devised, and that various other changes, within the scope of the invention, may be made in the mechanism which is described in detail herein as illustrating one of the structural forms contemplated.

What I claim is:

1. A device of the class described comprising a closed container, a stirring member for the liquid therein, a propeller wheel for said member, means for directing a liquid against said wheel for operating the same, and means including said first means for drawing off the air above said liquid.

2. The combination of a container for liquid, an agitator shaft therein, a water wheel for rotating said shaft, a nozzle for directing a stream of water to said wheel, and air conducting means extending from the interior of said container above the level of the liquid therein, into siphonic relation with said nozzle for removing air from said container.

3. A milk can cover having the usual depending flange, a housing on said cover, a water wheel in said housing, a shaft therefor extending through said cover, an agitator on said shaft, a water nozzle to direct a stream of water against said water wheel, and an air nozzle surrounded by said water nozzle and communicating with the space within said depending flange.

4. A milk can cover having an upstanding flange and a depending flange, a vertical shaft passing through said cover, an inverted cup shaped member secured to said shaft above said cover, propeller blades secured to said member, a non-rotatable bushing secured to said cover and surrounding said shaft within said cup shaped member to prevent leakage of liquid along said shaft and to provide a water seal, a liquid nozzle for directing liquid against said blades to rotate said shaft, an outlet in said upstanding flange to permit the discharge of liquid therefrom, and means tending to create a vacuum within said depending flange whereby air may be caused to pass through said water seal when said cover is applied to a can and thus permit withdrawal of the air within said depending flange by said vacuum means.

5. The combination of a milk can having a neck, of a cover having a depending flange fitting said neck, a housing on said cover, a water wheel therein, a vertical shaft passing through said cover and rotated by said water wheel, blades at the lower end of said shaft to agitate the milk in said can, two concentric nozzles associated with said housing, a water source connected to said outer nozzle to be directed against said water wheel and rotate the same, a pipe connecting said inner nozzle with a space within said depending flange above the level of the milk in the can to draw off the air therein, and a bearing for said shaft on said cover permitting a slight leakage of air therethrough to replace the air removed by suction.

6. An attachment for milk can covers comprising a housing to be secured to a can cover and having a water wheel therein to rotate about a vertical axis, and two concentric nozzles, one to direct water against said wheel and the other to create a partial vacuum in a pipe to pass through said cover.

7. An attachment for milk can covers comprising a housing to be secured to a can cover and having a shaft passing through an opening in said cover, a water wheel thereon, two concentric nozzles, a pipe extending from one of said nozzles through said cover, one of said nozzles directing water against said wheel and the other creating a partial vacuum in said pipe, an outlet from said housing for the water discharged from said wheel, arranged to maintain a supply of water in said housing and ball bearings for said shaft submerged in said water and having a clearance therethrough to permit air to be drawn through the water and through said shaft opening by said partial vacuum.

8. A device of the class described comprising a closure for a liquid container, a shaft passing through said closure and having an agitator on its lower end for stirring the liquid in the container upon which said closure is positioned, a propeller wheel adjacent the upper end of said shaft, means for directing a stream of liquid against said wheel for rotating said shaft, and a conduit communicating with the interior of said container above the level of the liquid therein, and communicating also in siphonic relation with said means, for removing air from said container.

9. A milk cooler and deodorizer comprising a can, a cover therefor, a rotatable agitator shaft passing through an opening in said cover, a water seal for said opening, means for rotating said agitator shaft, said can and cover having a tight fit to provide an air tight container for the milk, and means for drawing off the air above the level of the milk in said container, with a light vacuum, whereby leakage of air into said container takes place through said water seal only, thus washing and cooling said incoming air.

OMAR C. HARRIS.